United States Patent
Martin et al.

(10) Patent No.: US 7,220,373 B2
(45) Date of Patent: *May 22, 2007

(54) PROCESS FOR LIGHTENING PLASTERBOARDS

(75) Inventors: Daniel Martin, Lyons (FR); Robert Garcin, L'Isle d'Abeau (FR)

(73) Assignee: Lafarge Platres, Avignon (FR)

( * ) Notice: Subject to any disclaimer, the term of this patent is extended or adjusted under 35 U.S.C. 154(b) by 559 days.

This patent is subject to a terminal disclaimer.

(21) Appl. No.: 10/469,857

(22) PCT Filed: Mar. 5, 2002

(86) PCT No.: PCT/FR02/00786

§ 371 (c)(1),
(2), (4) Date: Dec. 31, 2003

(87) PCT Pub. No.: WO02/070427

PCT Pub. Date: Sep. 12, 2002

(65) Prior Publication Data

US 2004/0099362 A1    May 27, 2004

(30) Foreign Application Priority Data

Mar. 6, 2001   (FR) .................................. 01 03020

(51) Int. Cl.
*B29C 67/20*   (2006.01)
*C04B 24/16*   (2006.01)
*C04B 11/00*   (2006.01)

(52) U.S. Cl. ........................ 264/50; 106/680; 106/781; 156/39; 264/42

(58) Field of Classification Search ................. 264/42, 264/50; 156/39; 106/680, 781
See application file for complete search history.

(56) References Cited

U.S. PATENT DOCUMENTS

| 4,156,615 | A | * | 5/1979 | Cukier ........................ 156/39 |
| 4,618,370 | A | * | 10/1986 | Green et al. ........... 106/287.23 |
| 5,158,612 | A | * | 10/1992 | Savoly et al. ................ 106/678 |
| 5,240,639 | A | | 8/1993 | Diez et al. |
| 5,643,510 | A | | 7/1997 | Sucech |
| 5,714,001 | A | | 2/1998 | Savoly et al. |
| 7,033,431 | B2 | * | 4/2006 | Martin et al. ................ 106/781 |

FOREIGN PATENT DOCUMENTS

| WO | 95/16515 | 6/1995 |
| WO | 99/08978 | 2/1999 |
| WO | 00/06518 | 2/2000 |

* cited by examiner

*Primary Examiner*—Allan R. Kuhns
(74) *Attorney, Agent, or Firm*—Buchanan Ingersoll & Trooney PC

(57) ABSTRACT

Process for the manufacture of plasterboards exhibiting a core density of less than 0.77 comprising the stages of the formation of a foam from water and a surfactant composed of at least one alkyl sulphate of formula $H(CH_2)_nOSO_3^-M^+$, in which n is a number between 6 and 16, M is a monovalent cation and the mean number of carbon atoms $n_m$ is from 9 to 10, and the introduction of the foam obtained into a plaster slurry, characterized in that the amount of surfactant introduced does not exceed 0.32 g/l of plaster slurry. Application to the manufacture of lightened plasterboards.

21 Claims, No Drawings

PROCESS FOR LIGHTENING PLASTERBOARDS

The present invention relates to a process for the manufacture of lightened plasterboards.

A plasterboard is a prefabricated parallelepipedal component made of plaster (calcium sulphate dihydrate) covered with cardboard or paper or inorganic fibres on each of its faces. The composite thus formed exhibits good mechanical properties, the sheets on the faces acting both as framework and as facing.

The plaster core is obtained from a plaster slurry formed principally by mixing hydratable calcium sulphate and water, if appropriate with the addition of conventional adjuvants. The term "hydratable calcium sulphate" should be understood as meaning, in the present account, anhydrous calcium sulphate (anhydrite II or III) or a calcium sulphate hemihydrate ($CaSO_4 \cdot \frac{1}{2}H_2O$) in its $\alpha$ or $\beta$ crystalline form. Such compounds are well known to a person skilled in the art and are generally obtained by the calcination of a gypsum.

The slurry rapidly sets by hydration of the plaster. The boards are subsequently heated in dryers in order to remove the excess water.

The lightening of plasterboards, in addition to their mechanical strength, is what is really at stake here. In order to lighten the plasterboard, it is commonplace to introduce air into the slurry by adding a foam to the plaster slurry.

The reduction of the density of the plasterboards is desired for its two-fold economic advantage: first, it makes it possible to lighten the product and thus to facilitate its transportation and, secondly, it makes it possible to overcome the limitation on the production throughput by the reduction in the demand for plaster. This is because the calcination of the gypsum takes time and it is possible for this stage to be a limiting component on the speed of the production line. The decrease in the demand for plaster makes it possible in addition to reduce the production costs related to the calcination. Thus, the reduction of the density of the plasterboards makes it possible to decrease the transportation costs, to increase the line speed and, at the same time, to decrease the production costs.

Various surfactant compositions for lightening plasterboards are known. Often, these compositions comprise alkyl ether sulphates.

Thus, a surfactant composition based on alkyl sulphates and alkyl ether sulphates is disclosed in WO 9516515. In this composition, the ratio of alkyl sulphates to alkyl di- or triether sulphates is at least 12:1, preferably between 30:1 and 60:1. Alkyl sulphates alone are undesirable. This is because a plasterboard obtained with an alkyl sulphate alone exhibits very mediocre lightening.

The document U.S. Pat. No. 5,643,510 discloses the use of a mixture of alkyl sulphates and of alkyl ether sulphates in order to control the size of the air bubbles in plasterboards. The document indicates that alkyl sulphates, which form unstable foams, are not used alone as the production of a board with a given density would require a consumption approximately 3 times greater than that of a surfactant comprising an alkyl ether sulphate. The preferred surfactant is thus a mixture comprising approximately 10% of alkyl ether sulphate.

However, the use of alkyl sulphates instead of an alkyl ether sulphate as surfactant has certain advantages. This is because, whereas the alkyl sulphate can be obtained by direct sulphation of the corresponding fatty alcohol, it is necessary to pass through an ethoxylation stage to obtain the alkyl ether sulphate. This stage is not only expensive but can additionally result in the formation of undesirable by-products.

The problem which the invention intends to solve thus consists in providing a process for the manufacture of inexpensive lightened plasterboards using a surfactant which is inexpensive and readily available.

As a general rule, the quality of a surfactant is evaluated with respect to the volume of foam which it makes it possible to obtain. This is because, for the production of a given volume of foam, it appears logical that more will be consumed of a surfactant with a low foaming power. This has economic effects on the cost price of the plasterboard.

However, the stability of the foam before it is introduced into the plasterboard and then in the latter also constitutes a not insignificant factor. Thus, at an equal volume, a foam of low stability will result in a less lightened plasterboard than a stable foam. According to U.S. Pat. No. 5,643,510, alkyl sulphates form foams of low stability in plasterboard.

Furthermore, it is clear that the plasterboard must, even lightened, furthermore exhibit characteristics comparable to unlightened boards, such as the level of mechanical strength. The quality of the bonding between the plaster slurry and the faces of the boards, in dry as in wet surroundings, also constitutes a quality requirement which has to be satisfied.

The invention is based on the observation that, while certain alkyl sulphate compositions generally exhibit a slight excess consumption with respect to mixtures with alkyl ether sulphates, they make it possible to obtain plasterboards exhibiting a considerable reduction in weight. The possible additional economic cost is largely compensated for by such a reduction in weight. This is because the saving generated by the reduction in weight can represent up to 7 times the additional cost related to the additional consumption of surfactant. The balance therefore remains very positive overall.

The plasterboards thus lightened additionally exhibit entirely acceptable characteristics of mechanical strength and of bonding with the external faces.

This surprising effect appears to be related to an interaction between the surfactant, the foam and the plaster slurry.

This is because, while the foaming power of these alkyl sulphates is often lower compared with the usual surfactants comprising alkyl ether sulphates, it turns out that some of them make it possible to obtain foams compatible with the plaster slurry. Furthermore, contrary to the teaching of the prior art, it has been found that the excess consumption is very moderate and may even, in some cases, be nonexistent.

It appears that this effect is at least partially due to a very good compatibility between the plaster slurry and the foam, a function of their respective viscosities. More particularly, it appears that the fluidity of the two phases can be adjusted so that the mixing takes place without excessive loss of foam volume. Thus, the effectiveness of the foam generated by the surfactant is improved.

It thus appears that the consumption of surfactant and its ability to lighten are not solely a function of the foaming power of the latter but are also dependent on the complex interplay of the other parameters of the process. There is reason to believe that, in particular, the physicochemical characteristics of the plaster slurry, and in particular its fluidity, have an influence on the lightening effect obtained.

A subject-matter of the invention is thus a process for the manufacture of plasterboards exhibiting a core density of less than 0.77 comprising the stages of:

formation of a foam from water and a surfactant composed of at least one alkyl sulphate of formula $H(CH_2)_n$ $OSO_3^-M^+$, in which n is a number between 6 and 16, M is a monovalent cation and the mean number of carbon atoms $n_m$ is from 9 to 10, and introduction of the foam obtained into a plaster slurry, characterized in that the amount of surfactant introduced does not exceed 0.32 g/l of plaster slurry.

The term "density" is understood to mean the ratio of the mass of a given volume of plaster slurry to the mass of this volume of water. The term "core density" is understood to mean the density of the plasterboard with the exclusion of the material covering the faces.

Preferably, the consumption of surfactant is less than 0.24 g/l and in particular less than 0.16 g/l of plaster slurry. Generally, the consumption is greater than 0.05 g/l of plaster slurry for boards with a thickness of 12.5 mm and 0.02 g/l for boards with a thickness of 6 mm.

The plasterboard produced preferably exhibits a compressive strength of greater than 2 MPa and in particular of greater than 3 MPa.

According to a preferred embodiment, the surfactant comprises 5 to 60% by weight of dodecyl sulphate.

According to a preferred embodiment, the surfactant comprises 40 to 95% by weight of decyl sulphate. According to another preferred embodiment, the surfactant comprises 5 to 60% by weight of octyl sulphate. The particularly preferred surfactant comprises 5 to 15% by weight of sodium octyl sulphate and 85 to 95% by weight of sodium decyl sulphate.

The particularly preferred surfactant exhibits a mean number of carbons of between 9.5 and 10, preferably from 9.7 to 9.9.

Preferably, M is chosen from sodium, potassium, magnesium and ammonium.

According to one embodiment, the surfactant additionally comprises a sequestering agent and/or a hydrotropic agent.

The invention also relates to the use of a surfactant for lightening plasterboards composed of at least one alkyl sulphate of formula $H(CH_2)_nOSO_3^-M^+$, in which n is a number between 6 and 16, M is a monovalent cation and the mean number of carbon atoms $n_m$ is from 9 to 10, the amount used being less than 0.32 g/l of plaster slurry.

Preferably, the said surfactant is used to produce plasterboards exhibiting a core density of less than 0.77, in particular of less than 0.74 and very particularly of less than 0.72. However, the density of the core is generally greater than 0.48.

Other characteristics and advantages of the invention will now be described in detail in the account which follows.

The plaster composition comprises plaster, water and a surfactant composition. It can furthermore comprise other additives as conventionally used.

Furthermore, the foam formed by the targeted surfactant composition makes it possible to obtain comparable reductions in weight for plasterboards prepared with different types of gypsum. Thus, the surfactant composition is advantageous in that it is relatively insensitive to the quality of gypsum employed.

Furthermore, the characteristics of the foam formed by the surfactant composition are relatively insensitive to temperature. Thus, when the temperature of the water varies, the foam volume generated remains substantially constant.

In addition, it turned out that the quality of bonding between the plaster and the external sheet of the plasterboards is outstanding.

The mechanical characteristics of plasterboards are usually evaluated by the flexural strength of the core, the hardness of the core, the ball hardness and the compressive strength of the plasterboard. The resistance which the plasterboard makes to a ¼-inch nail head being driven in, which in conventionally called the "nail pull test" or punching strength, is also of great practical importance. The conditions of this test are described in ASTM Standard C473-Method B.

Furthermore, it turns out that the plasterboards obtained show good bonding between the plaster and the external sheet.

An appropriate surfactant composition for the implementation of the process is, for example, a mixture of $C_8$ and $C_{10}$ alkyl sulphates, such as Emal A10 DE, sold by Kao Corporation SA. However, it is also possible to carry out mixing starting from other alkyl sulphates or from mixtures of alkyl sulphates to produce a composition having a mean carbon number of 9 to 10.

The alkyl sulphates corresponding to the formula $H(CH_2)_n-OSO_3M$ are generally obtained by sulphation of the corresponding alcohols. In principle, n is generally an even number because of the better availability of these alcohols. However, alkyl sulphates with n uneven can also be used in the context of the invention.

The chain of the alkyl sulphates participating in the composition preferably comprises from 8 to 12 carbon atoms.

The surfactant composition can additionally include a hydrotropic agent. Such hydrotropic agents are, for example, methanol, ethanol, isopropanol, ethylene glycol, propylene glycol, polyethylene glycol and polypropylene glycol, as well as ethylene glycol monoalkyl ethers, alkyl polyglycosides and their mixtures.

The composition can advantageously comprise a sequestering or chelating agent which makes it possible to keep in solution magnesium or calcium ions, in particular in hard water. Such sequestering or chelating agents are, for example, hydroxycarboxylic acids and their salts, aldoses and ketoses, inorganic complexing agents, more particularly phosphates, borates and polyphosphates, organic complexing agents chosen more particularly from the group consisting of EDTA, NTA, and the like, and phosphoric acid derivatives with a polymer structure which comprise hydroxyl and/or amine and/or carboxylate groups.

The foam obtained makes it possible to introduce, into the plasterboard, from 0.01 to 0.04% by weight of surfactant (expressed on a dry basis) with respect to the weight of the board. It represents a volume of between 20 and 40% of that of the plasterboard.

The foam-based plasterboard can moreover advantageously comprise adjuvants which are conventionally used, such as plasticizers, accelerators, starch, and the like.

The invention will be better understood from the viewpoint of the examples which follow, which are given by way of illustration and without implied limitation.

EXAMPLES

Example 1

Miniboards with an area of 0.1 m² and with a thickness of 12.5 mm are prepared from St Loubes plaster, which is a plaster obtained by flash calcination of a natural gypsum having the following characteristics:

gypsum content: 68.8%
anhydrite: 0.90%
magnesia: 3.70%
dolomite: 8.80% talc: 0.80%
phlogopite: 1.10%
microline: 3.80%
quartz: 9.50%
celestine: 0.60%
clinochlore: 2.00%.

These boards are prepared in the following way:

A foam is prepared by stirring, for 1 minute in a foam generator of the Hamilton Beach type set to a voltage of 55 volts, a mixture of 5.25 ml of a 50 g/l solution of a composition composed of sodium alkyl sulphates comprising 47% by weight of $C_8$ alkyl and 53% by weight of $C_{10}$ alkyl, the mean carbon number $n_m$, taking into account the molar masses of the constituents, being 9, with 170 ml of water at 22° C. The foam is subsequently introduced into a mixture of 700 g of water at a temperature of 50° C. and 1130 g of plaster at a temperature of 22° C. The plaster slurry is deposited between two sheets of cardboard. The excess after filling is removed. The miniboard is subsequently dried in an oven at a steadily increasing temperature of from 100° C. to 200° C. over 15 min, and then a steadily decreasing temperature from 200° C. to 90° C. over 25 min.

Example 2

Plasterboards are manufactured according to Example 1 but replacing the surfactant composition with the same amount of a surfactant comprising 25% by weight of $C_8$ alkyl sulphate and 75% by weight of $C_{10}$ alkyl sulphate. The mean number of carbon atoms $n_m$ in the composition is 9.5.

Example 3

Plasterboards are manufactured according to Example 1 but replacing the surfactant composition with the same amount of a surfactant comprising 11% by weight of $C_8$ alkyl sulphate and 89% by weight of $C_{10}$ alkyl sulphate. The mean number of carbon atoms $n_m$ in the composition is 9.8.

Example 4

Plasterboards are manufactured according to Example 1 but replacing the surfactant composition with the same amount of a surfactant comprising 33.3% by weight of $C_8$ alkyl sulphate, 58.4% by weight of $C_{10}$ alkyl sulphate and 8.3% by weight of $C_{12}$ alkyl sulphate. The mean number of carbon atoms $n_m$ in the composition is 9.5.

Example 5

Plasterboards are manufactured according to Example 1 but replacing the surfactant composition by the same amount of a surfactant comprising 75% by weight of $C_8$ alkyl sulphate and 25% by weight of $C_{10}$ alkyl sulphate. The mean number of carbon atoms $n_m$ in the composition is 8.5.

Example 6

Plasterboards are manufactured according to Example 1 but replacing the surfactant composition with the same amount of a surfactant comprising an alkyl sulphate (AS) and an alkyl ether sulphate (AES). This surfactant is sold by Stepan under the name Alphafoamer.

The boards prepared according to the examples, once dried to constant weight in agreement with French Standard NF P 72–302, are weighed and their core densities are determined. The results are recorded in Table 1 below.

TABLE 1

| Example | $n_m$ | Foam volume [ml] | Density of the board |
|---|---|---|---|
| 1 | 9.0 | 688 | 0.728 |
| 2 | 9.5 | 688 | 0.712 |
| 3 | 9.8 | 695 | 0.692 |
| 4 | 9.5 | 700 | 0.698 |
| 5* | 8.5 | 680 | 0.771 |
| 6* | AS + AES | 750 | 0.700 |

*Comparative examples

The compositions according to the invention make it possible, without excess consumption in comparison with mixtures of alkyl sulphates and of alkyl ether sulphates, to obtain comparable reductions in weight. Example 3 illustrates a preferably used surfactant composition.

To evaluate the mechanical properties of the boards, the compressive strength is measured from a 5×5 $cm^2$ sample withdrawn from the board. The ball hardness and the load at failure of the core (three-point bending test) are measured according to NF Standard P 72-302.

The hardness of the core and the punching strength (nail pull test) are measured according to ASTM Standard C473 Method B.

The results obtained demonstrate that, with a surfactant composition according to the prior art (Example 6), when the core densities are equivalent, the mechanical performance obtained is inferior to that which is achieved by virtue of the process according to the invention.

The performance obtained with the composition according to Example 5 corresponds to boards having a higher core density.

Thus, at a satisfactory mechanical performance, the preferred implementation corresponds to that which results in the maximum reduction in weight. The results of these measurements are recorded in Table 2 below.

TABLE 2

| Example | Amount surfactant used (g/l) | Compressive stress [MPa] | Ball hardness [mm] | Core hardness [DaN] | Nail pull [DaN] |
|---|---|---|---|---|---|
| 1 | 0.139 | 3.72 | 18.70 | 9.60 | 37 |
| 2 | 0.139 | 3.63 | 19.90 | 11.40 | 38 |
| 3 | 0.136 | 3.46 | 18.65 | 9.55 | 34.8 |
| 4 | 0.138 | 3.52 | 18.78 | 10.25 | 35.9 |
| 5* | 0.152 | 4.52 | 17.30 | 14.00 | 42 |
| 6* | 0.134 | 2.59 | 19.8 | 7.6 | 32.6 |

*Comparative examples

Furthermore, the plasterboards prepared were characterized by the measurement of the bonding between the cardboard and the core. The measurement consists in tearing off the cardboard and in evaluating the percentage of detachment of the cardboard from the core. The dry bonding test is carried out on a dry board. The wet bonding test after 2 hours is carried out after rehumidification for 2 hours at 30° C. in a controlled atmosphere at 90% humidity. The results are recorded in Table 3 below.

TABLE 3

| Example | Dry bonding (% detachment) | Wet bonding after 2 hours (% detachment) |
|---|---|---|
| 1 | 0 | 6 |
| 2 | 0 | 4 |

TABLE 3-continued

| Example | Dry bonding (% detachment) | Wet bonding after 2 hours (% detachment) |
|---------|---------------------------|------------------------------------------|
| 3       | 0                         | 4                                        |
| 4       | 0                         | 5                                        |
| 5*      | 0                         | 7                                        |
| 6*      | 3                         | 30                                       |

*Comparative examples

The results demonstrate the superiority of the compositions according to the invention with regard to the bonding, whether dry bonding or wet bonding after 2 hours, in particular with respect to surfactants comprising alkyl ether sulphates.

The invention claimed is:

1. A process for manufacture of plasterboards exhibiting a core density of less than 0.77, the process comprising:
   forming a foam from water and a surfactant comprising at least one alkyl sulphate of formula $H(CH_2)_n OSO_3^- M^+$, in which n is a number between 6 and 16, M is a monovalent cation and a mean number of carbon atoms $n_m$ is from 9 to 10, and
   introducing the foam into a plaster slurry,
   wherein the amount of surfactant introduced does not exceed 0.32 g/liter of plaster slurry,
   wherein the surfactant composition is free from alkyl ether sulphates.

2. The process according to claim 1, in which the amount of surfactant is less than 0.24 g/l of plaster slurry.

3. The process according to claim 1, in which the plasterboard produced exhibits a compressive strength of greater than 2 MPa.

4. The process according to claim 1, in which the surfactant comprises 5 to 60% by weight of dodecyl sulphate.

5. The process according to claim 1, in which the surfactant comprises 40 to 95% by weight of decyl sulphate.

6. The process according to claim 1, in which the surfactant comprises 5 to 60% by weight of octyl sulphate.

7. The process according to claim 1, in which M is chosen from sodium, potassium, magnesium and ammonium.

8. The process according to claim 1, in which the surfactant comprises 5 to 25% by weight of sodium octyl sulphate and 75 to 95% by weight of sodium decyl sulphate.

9. The process according to claim 1, in which the surfactant comprises 5 to 15% by weight of sodium octyl sulphate and 85 to 95% by weight of sodium decyl sulphate.

10. The process according to claim 1, in which the surfactant additionally comprises a sequestering agent.

11. The process according to claim 1, in which the surfactant additionally comprises a hydrotropic agent.

12. A method for lightening plasterboards using a surfactant comprising at least one alkyl sulphate of a formula $H(CH_2)_n OSO_3^- M^+$, in which n is a number between 6 and 16, M is monovalent cation and a mean number of carbon atoms $n_m$ is from 9 to 10, wherein the method includes mixing a foam of surfactant and water with a plaster slurry, the amount of surfactant used being less than 0.32 g/l of plaster slurry,
   wherein the surfactant composition is free from alkyl ether sulphates.

13. The method according to claim 12, in which the plasterboard exhibits a core density of less than 0.77.

14. A process for manufacture of plasterboards exhibiting a core density of less than 0.77, the process comprising:
   forming a foam from water and a surfactant comprising at least one alkyl sulphate of formula $H(CH_2)_n OSO_3^- M^+$, in which n is a number between 6 and 16, M is a monovalent cation and a mean number of carbon atoms $n_m$ is from 9 to 10, and
   introducing the foam into a plaster slurry,
   wherein the amount of surfactant introduced does not exceed 0.32 g/liter of plaster slurry,
   wherein the surfactant comprises 5 to 60% by weight of dodecyl sulphate.

15. The process according to claim 14, in which the amount of surfactant is less than 0.24 g/l of plaster slurry.

16. The process according to claim 14, in which the plasterboard produced exhibits a compressive strength of greater than 2 MPa.

17. The process according to claim 14, in which the surfactant comprises 40 to 95% by weight of decyl sulphate.

18. The process according to claim 14, in which the surfactant comprises 5 to 60% by weight of octyl sulphate.

19. The process according to claim 14, in which M is chosen from sodium, potassium, magnesium and ammonium.

20. The process according to claim 14, in which the surfactant additionally comprises a sequestering agent.

21. The process according to claim 14, in which the surfactant additionally comprises a hydrotropic agent.

* * * * *